(12) United States Patent
Addicks

(10) Patent No.: US 6,795,545 B1
(45) Date of Patent: Sep. 21, 2004

(54) METHOD AND SYSTEM FOR ASSIGNMENT OF NUMBERS AS ADDRESSES FOR STATIONS ON A SWITCHED NETWORK

(75) Inventor: Stephen Addicks, Gainesville, VA (US)

(73) Assignee: MCI, Inc., Ashburn, VA (US)

( * ) Notice: Subject to any disclaimer, the term of this patent is extended or adjusted under 35 U.S.C. 154(b) by 237 days.

(21) Appl. No.: 09/983,690

(22) Filed: Oct. 25, 2001

(51) Int. Cl.[7] .............................................. H04M 7/00
(52) U.S. Cl. .............................. 379/220.01; 379/221.14
(58) Field of Search ........................ 379/221.13, 221.02, 379/220.01, 221.14

(56) References Cited

U.S. PATENT DOCUMENTS 6,128,377 A * 10/2000 Sonnenberg ........... 379/221.13
6,327,349 B1 * 12/2001 Rollins .................. 379/114.27

* cited by examiner

Primary Examiner—Ahmad F. Matar
Assistant Examiner—Quynh H. Nguyen

(57) ABSTRACT

A method, and a switched network adapted to carry out the method, and computer-readable media carrying instructions for controlling the network, to increase the utilization of the North American Numbering Plan. Numbers that otherwise would be stranded in a low growth rate area are ported to a network switch serving another rate area. When a switch receives a called number it determines if the number is portable and, if so, accesses a database to determine if the number has been ported. If the number has been ported the switch processes the call in accordance with information linked to the number in the database so that stranded numbers can be assigned to stations without regard to the rate area in which the stations are located.

10 Claims, 5 Drawing Sheets

| CALLED NUMBER | LRN | RATE AREA IDENTIFIER |
|---|---|---|
| NPA-NXX-XXXX | YYY-YYY | ZZZ-ZZZ |

METHOD AND SYSTEM FOR ASSIGNMENT OF NUMBERS AS ADDRESSES FOR STATIONS ON A SWITCHED NETWORK

FIELD OF THE INVENTION

The present invention relates to assignment of addresses to stations on a network such as the public switched telephone network. More particularly, it relates to a method and a network comprising switches and database management systems for implementing such method, for assigning destination addresses, e.g. telephone numbers, to stations on the network without regard to rate areas in which the stations are located.

BACKGROUND OF THE INVENTION

Currently, it is anticipated that the North American Numbering Plan (NANP) will reach exhaustion in the near future, perhaps as early as the year 2007. The NANP uses a 10 digit telephone number format for end user network addresses, i.e. telephone numbers, and eventually continued growth of the telephone network will exhaust the NANP, making it necessary to enlarge the telephone number format. This change will have a major impact. Everything that uses a telephone number will be affected. Major expenditures to accommodate the new format will be required worldwide. All countries using NANP must agree to the new format and to a transition method. Various national regulators must then order the agreed solution and then years will be required to implement the necessary hardware changes. Even the cutover period may be spread over an extended interval. While it is important to decide as soon as possible how the NANP expansion will be accomplished, it is also important to defer actually implementing the expansion as long as possible. The present value of the expansion's cost shrinks the longer the expansion can be delayed and the actual cost can actually be reduced since the changes required to implement the NANP expansion can be included in the normal modernization of equipment.

While the growth in use of the network drives the exhaustion of the NANP and is expected to reach a point where more than the 10 billion currently possible numbers will be needed, inefficiencies in the way numbers are assigned will hasten that date. Particularly, the use of numbers in the NANP to identify not just particular stations on the network but also the geographical area where the stations are actually located; and the manner in which numbers are assigned to particular geographical areas, can result in numbers being "stranded" in low-growth areas where they are unlikely to be assigned to an end user in the foreseeable future. An extreme example of this problem occurs in one area code where the assignee of the present invention uses approximately 7% of the numbers assigned.

A rate area is a geographic area represented by a single point, the "rate center". The rate center is used to represent the physical location of all end users located within the rate area. Distance is calculated between the calling station and the called station based on the rate centers associated with each station. Groups of rate areas form a station's calling area. Local calling plans for end users are usually defined as calls between certain pairs of rate areas. Rate areas determine whether inter-carrier settlements are done for local or toll traffic minutes. This is an important distinction as "toll" access minutes cost about 3 times as much as "local" traffic minutes. Rate areas are thus very important to local service providers. Currently, the first 6 digits of a 10 digit telephone number, hereinafter sometimes NPA-NXX, nominally indicate the rate area in which the identified rate station is located. Carriers comprised in the network rely on the NPA-NXX of a called telephone number to identify the called station's associated rate area and thus each NPA-NXX must correspond to only one rate area.

Typically, though not necessarily, the NPA-NXX of a number is also used to identify the switch serving the called station in order to route the call through the network, as will be described further below. Within a given area code (NPA) an office code (NXX) is assigned to a switch and to a rate area served by that switch. That is, the 10 thousand numbers defined by the last 4 digits are assigned by the network administrator to a particular switch and a particular rate area served by that switch. In rate areas that are growing slowly, or are served by a large number of carriers, assignment of numbers in blocks of 10 thousand can result in a large fraction of "stranded" numbers.

To address this problem a "thousand-block number pooling" method of number assignment has been implemented in the telephone switched network. Blocks of one thousand numbers are "ported" from the switch normally associated with an NXX to another switch serving the same rate area. This breaks the relation between NPA-NXX and the switch, and calls are routed based on pointers (LRN's) associated with the ported numbers in a database maintained by the network Administrator. It has recently been proposed to extend this approach to the porting of individual telephone numbers.

While the above described approaches to number assignment have proven to be somewhat effective in increasing the utilization of numbers in rate areas served by more than one switch, "number pooling" approaches still require that particular NPA-NXX's be associated with a single rate area with the result that large fractions of numbers assigned to low-growth areas can be stranded". Consequently, there is a need for a number assignment method, and a network adapted to such a method, which will allow the assignment of "stranded" numbers without regard to rate areas in which stations are located, and thereby improve utilization of the NANP.

SUMMARY OF THE INVENTION

These and other needs are addressed by the present invention by means of a method and network, and computer-readable media carrying instructions for controlling the network to carry out the method. In accordance with an embodiment of the present invention a method for improving the utilization of numbers in a switched network, each of the numbers having an associated rate area, includes: a) requesting that a number not assigned to a station in the rate area nominally indicated by the number be ported to a switch serving a different rate area; b) storing information associating the number with the different rate area in a database; and c) thereafter, providing the associating information from the database in response to requests from switches which have received the number as a called number.

In accordance with an aspect of the invention the associating information includes a Local Routing Number.

In accordance with an another aspect of the invention the method further includes a) defining a group of numbers as portable; b) providing data identifying the group of numbers to switches routing calls to the switch serving the different rate area; c) controlling the routing switches to determine locally if a received called number is portable; and d) controlling the routing switches to request associating information for the received called number from the database only if the received called number is portable.

In accordance with an aspect of the invention the number is initially associated with a wireless network.

In accordance with an aspect of the invention the routing switches are further programmed to determine the rate area directly from the number if accessing the database system does not determine a rate area associated with the number.

In accordance with an another aspect of the invention a switched network including: a) a first wire center serving a destination station; b) a billing system for determining if calls are local or toll, end user charges, and carrier settlement amounts; c) a database system including a network database and a network database manager, the database manager being programmed to receive and maintain in the network database information associating numbers that are not assigned to stations in rate areas nominally indicated by the numbers with different rate areas; and d) a second wire center communicating with the first wire center, the database system, and the billing system; the second wire center including a programmable switch; the switch being programmed to: d1) receive a called number identifying the destination station; d2) access the database system to determine a rate area associated with the destination station; d3) transmit billing information for the call to the billing system in accordance with the associated rate area; and d4) route the call to the first wire center.

In accordance with an another aspect of the invention the network includes a Number Portability Administration Center system communicating with database managers in a public switched network to receive information indicating when a number that is not assigned to a station is ported to a switch serving a rate area, and to provide information associating said number and said rate area to said network database manager.

In accordance with an still another aspect of the invention a computer-readable medium carries one or more sequences of one or more instructions for controlling a network database manager to reduce the fraction of numbers stranded in a rate area, the one or more sequences of one or more instructions including instructions which, when executed by one or more processors, cause the one or more processors to control said system to perform the steps of: a) receiving information associating numbers that are not assigned to stations in rate areas nominally indicated by the numbers with different rate areas; b)maintaining said associating information in a network database; and c) thereafter, providing said associating information from said network database in response to requests from switches which have received said numbers as called numbers.

In accordance with yet another aspect of the invention the a computer-readable medium carries one or more sequences of one or more instructions for controlling a Number Portability Administration Center system to reduce the fraction of numbers stranded in a rate area, the one or more sequences of one or more instructions including instructions which, when executed by one or more processors, cause the one or more processors to control said system to perform the steps of: a) communicating with database managers in a public switched network to receive information indicating when a number that is not assigned to a station is ported to a switch serving a rate area; b) providing information associating said number and said rate area to the network database managers.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, a network adapted to such method, and software for assigning numbers to stations without regard to the rate areas associated with the stations, are described. In the following description, for the purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid unnecessarily obscuring the present invention.

Figure 1:
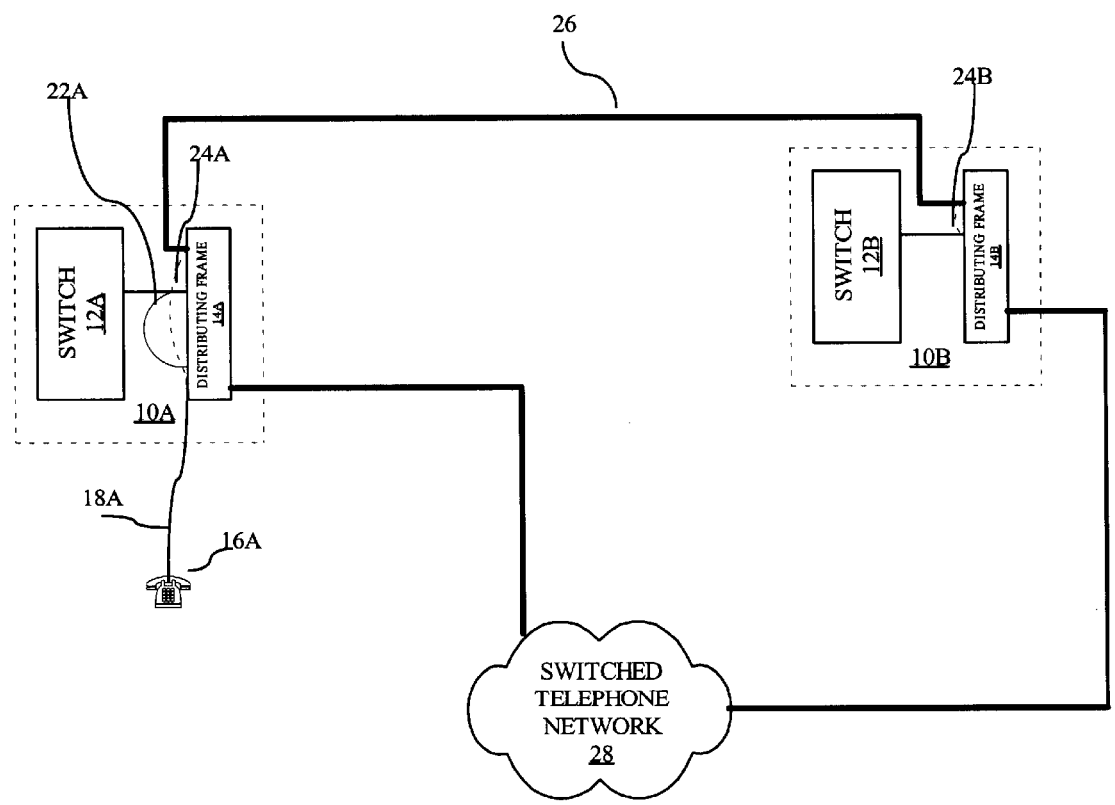
FIG. 1 shows an existing method for allowing an end user to change carriers while retaining the same number.

FIG. 1 shows a schematic representation of the existing public switched telephone network, and illustrates the transfer of service for an end user between two carriers serving the same rate area. Wire centers 10A and 10B typically comprise switches 12A and 12B and distributing frames 14A and 14B. Initially an end user receives service from the carrier who operates wire center 10A through station 16A, which is connected to distributing frame 14A by loop 18A. Jumper 22A establishes a connection between switch 12A and loop 18A and switch 12A is programmed to assign a number which is in its inventory to loop 18A and station 16A. That is, switch 12A will assign a number to station 16A which is associated with switch 12A and which is associated with the rate area of station 16A.

If the end user of station 16A wishes to change service providers, jumper 22A is removed and loop 18A is connected through jumpers 24A and 24B and tie cable 26 to switch 12B, operated by the new service provider. Calls originating from station 16A are now handled by switch 12B in the same manner as previously handled by switch 12A. However, calls for which station 16A is the destination station can no longer be routed in accordance with the NPA-NXX originally assigned to station 16A, since that NPA-NXX is associated with switch 12A. The end user may retain the number for station 16A if it is "ported" to switch 12B. When an originating switch on telephone network 28 routes a call whose destination is identified by a "portable" number; rather than rely on the NPA-NXX of the destination number the originating switch accesses a database maintained by the network Administrator to determine if that number has been "ported" and, if so, obtains a Local Routing Number (LRN) from the database, which it uses to route the call to the proper switch serving the destination station.

Figure 2:
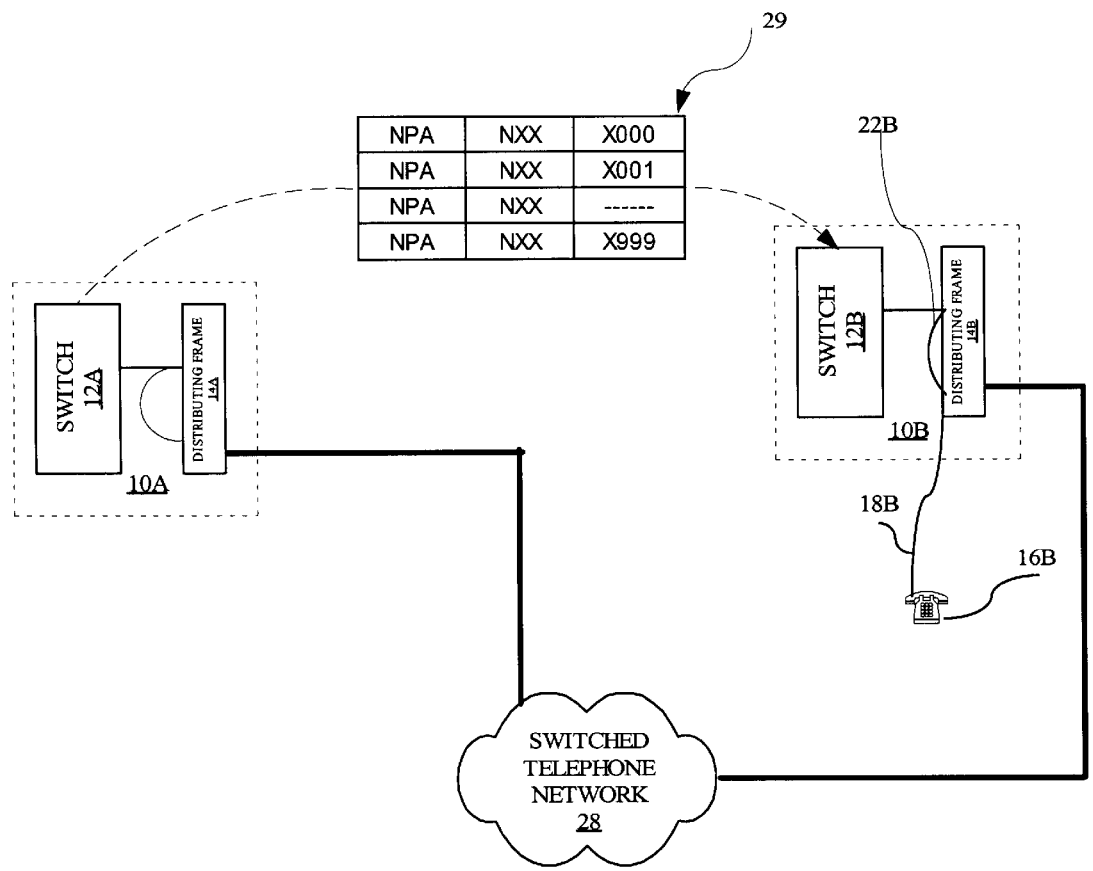
FIG. 2 illustrates the "porting" of number between switches serving the same rate area.

Groups of unassigned numbers may also be "ported" to reduce the "stranding" of numbers. In FIG. 2 "thousand-block" 29 is ported from switch 12A to switch 12B. Switch 12B is then connected to loop 18B and station 16B though jumper 22B and can assign any of the ported numbers to station 16B. When a call is destined for station 16B originating switches obtain an LRN from the database in the manner described above. Smaller groups of numbers, and even single unassigned numbers can be ported in a similar manner. The ported numbers cannot, however, be assigned to a station which is not in the rate area which is associated with the NPA-NXX of the ported number. Thus a significant fraction of numbers may be stranded in low-growth rate areas.

A concept known as "geographic number portability", which would allow a number assigned to an end user to be ported to switch serving a new rate area if the end user wished to relocate its service to a station in the new rate area while retaining the same number, has been proposed. Rate areas for destination stations would not be determined from the NPA-NXX but would be obtained from a database in substantially the same manner as LRN's. Geographic portability, however does not address the problem of unassigned numbers that are stranded in low growth rate areas.

Figures 3, 4:
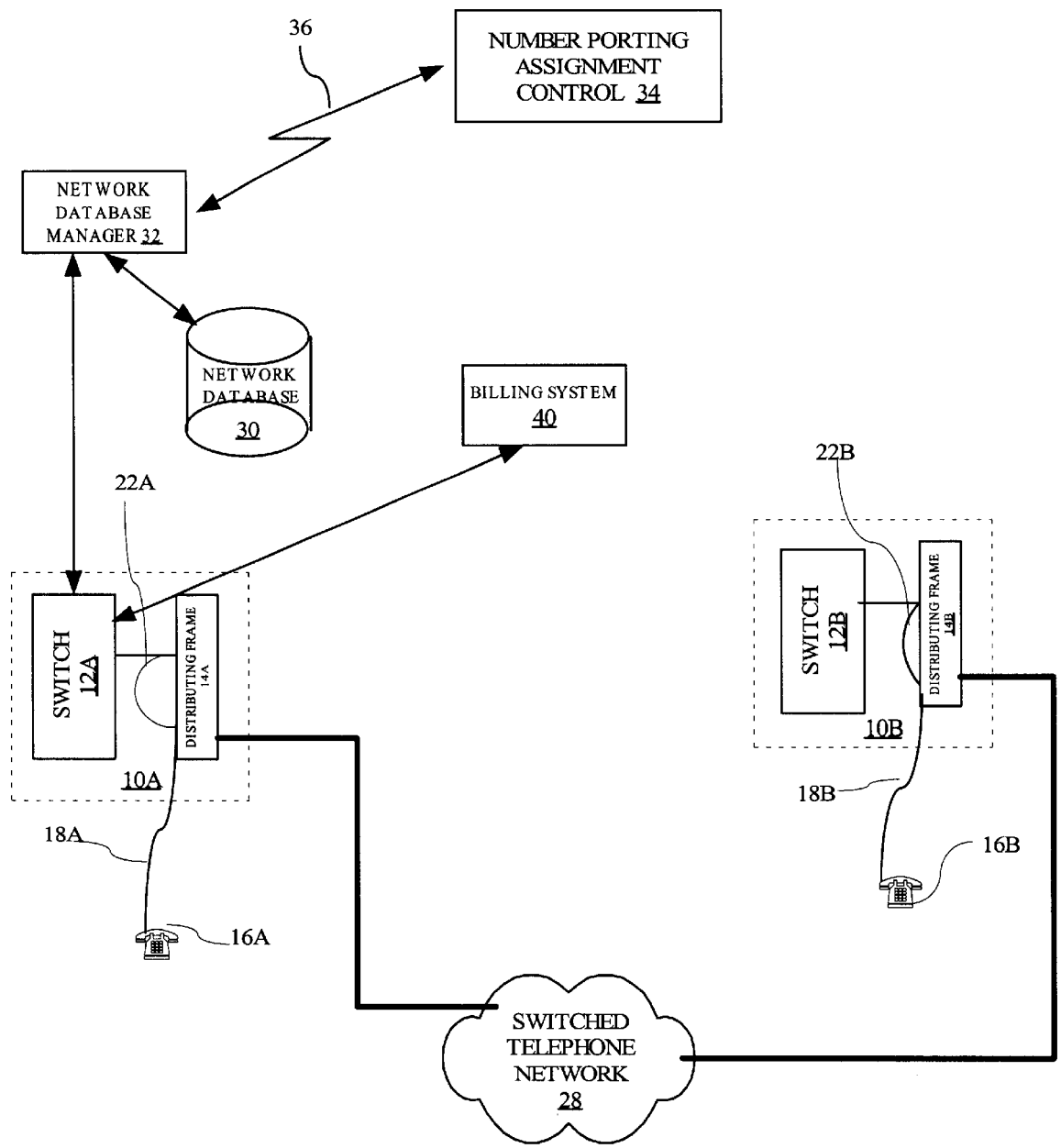
FIG. 3 shows a network adapted to allow the assignment of numbers without regard to rate areas.
FIG. 4 shows a typical record stored in the ported number database of FIG. 3.

In accordance with the present invention, FIG. 3 shows a switched network for routing of calls from originating station 16A to destination station 16B over switched telephone network 28. Originating station 16A is connected through loop 18A, distributing frame 14A and jumper 22A to switch 12A. Switch 12A includes data structure which identifies portable NPA-NXX; and communicates with network database 30 to determine the corresponding LRN and rate areas for numbers which have been ported. Database 30 communicates with and is updated by network database manager 32. Database 30 and database manager 32 are maintained by the administrator of the local network that includes switch 12A to provide LRN's and rate areas for ported numbers to all switches on the local network. Database manager 32 communicates with Number Portability Administration Center (NPAC) system 34 over conventional communications link 36. NPAC system 34 communicates with all network database managers in the public switched telephone network (not shown) to receive information indicating when a number is ported to a switch. NPAC system 34 then provides LRN's and Rate Area Indicators to database manager 32, and database managers for other networks (not shown) comprised in the public switched network, which then updates database 30. Switch 12A also communicates with a conventional billing system 40 to provide billing information, including the rate area of the destination station, so that billing system 40 can determine if the call is a local or a toll call and determine charges to the end user and settlement amounts to be paid to the various carriers involved in connecting the call.

FIG. 4 shows a record in database 30. Each record in database 30 associates a particular called number with an LRN and a Rate Area Indicator, if the called number has been ported. The LRN identifies the switch to which the called number has been ported and the Rate Area Identicator identifies the rate area associated with the ported called number. Such numbers are referred to as "transparent numbers" since they may be ported to any switch and any rate area served by such switch without regard to the normal assignment of the NPA-NXX of the number. Preferably the LRN and the Rate Area Indicator are the NPA-NXX for the switch and rate area to which the number has been ported to minimize the necessary modifications to the various network components. Once the switch and rate area for the destination station of the call are identified, either from database 30 or from the called number NPA-NXX, switch 12A routes the call through switched network 28 to the appropriate switch here shown as switch 12B. Switch 12B then connects the call through jumper 22B and through 18B to destination station 16B in a conventional manner.

Figure 5:
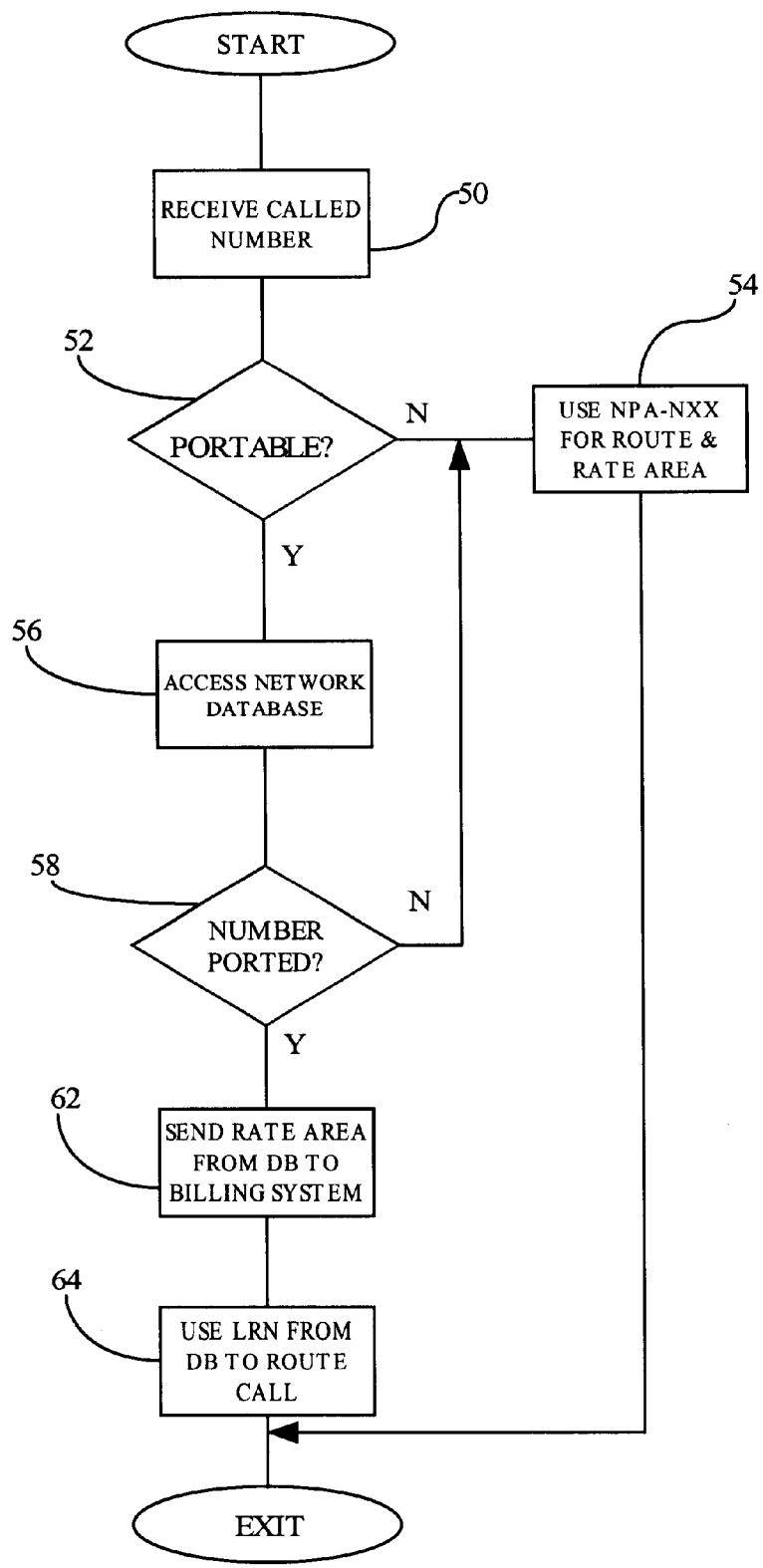
FIG. 5 shows a flow diagram of the operation of switch 12A in routing a call in the network of FIG. 3.

FIG. 5 shows a flow diagram of the operation of switch 12A in routing a call. At 50 switch 12A receives a called number, and at 52 determines if the called number is a portable number. If the called number is not portable then at 54 switch 12A uses the NPA-NXX of the called number to determine the switch serving the destination station and the associated rate area for the destination station and thereafter processes the call in a conventional manner. If the called number is portable then at 56 switch 12A accesses network database 30 to determine if the called number has been ported and, if so, the corresponding LRN and Rate Area Indicator for the called number.

At 58 switch 12A determines if the called number has been ported. Null entries for the LRN and Rate Area Indicator fields indicate that the number has not been ported. If the number has not been ported, switch 12A returns to 54 and processes the call conventionally. Otherwise, at 62, switch 12A uses the LRN and/or Rate Area Indicator to process the call and includes these values in any billing record it creates for later delivery to billing system 40.

To simplify the description, the present has been described only in respect to the switches serving the originating and destination stations. As is known, calls may actually be routed through one or more intermediate switches, which can be part of an intermediate network. In other embodiments of the present invention database access to determine the rate area associated with the destination station is carried out by one of such intermediate switches.

Figure 6:
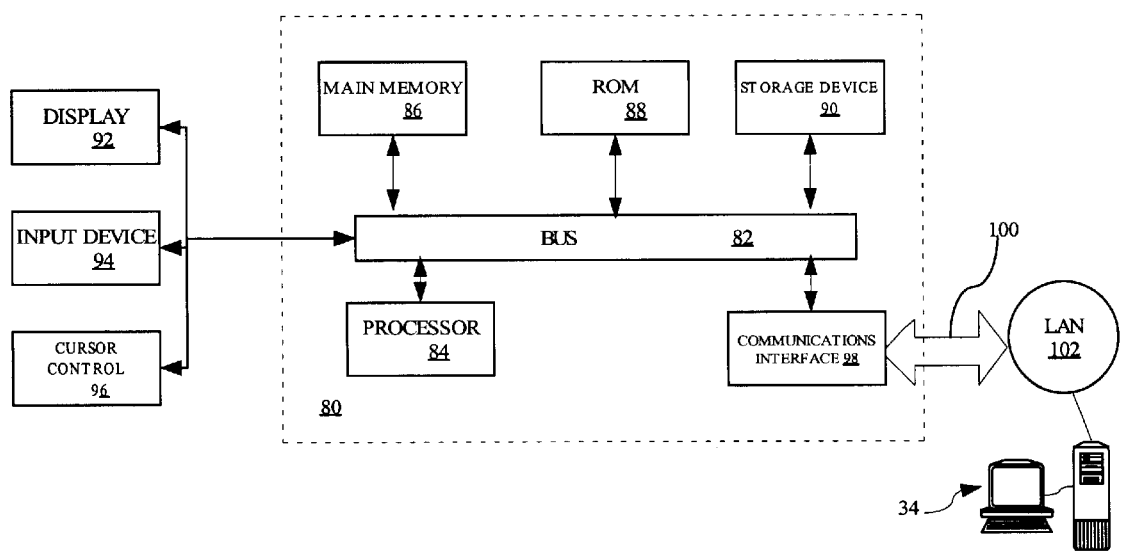
FIG. 6 shows a computer system that can be used to execute various elements of program code to implement the functions of the network switches, or of the database manager of FIG. 3, in accordance with the present invention.

FIG. 6 is a block diagram that illustrates a more detailed representation of a general purpose computer system 80. System 80, or similar systems, also can be programmed to provide control functions for switches such as switch 12A. Other architectures can also serve as database manager 32, or NPAC 34, or provide such control functions, and any form of data processing system that can be programmed to carry out the functions described above is within the contemplation of the present invention. In the embodiments shown, data processing system 80 includes bus 82 or other communication mechanism for communicating information, and processor 84 coupled with bus 82 for processing information. Data processing system 80 also includes main memory 86, such as a random access memory (RAM) or other dynamic storage device, coupled to bus 82 for storing information and instructions to be executed by processor 84. Main memory 86 also may be used for storing temporary variables or other intermediate information during execution of instructions to be executed by processor 84. Data processing system 80 further includes a read only memory (ROM) 88 or other static storage device coupled to bus 82 for storing static information and instructions for processor 84. A storage device 90, such as a magnetic disk or optical disk, is provided and coupled to bus 82 for storing information and instructions.

Data processing system 80 may be coupled via bus 82 to a display 92, such as a cathode ray tube (CRT), for displaying information to a computer user. An input device 94, including alphanumeric and other keys, is coupled to bus 82 for communicating information and command selections to processor 84. Another type of user input device is cursor control 96, such as a mouse, a trackball, or cursor direction keys for communicating direction information and command selections to processor 84 and for controlling cursor movement on display 92. This input device typically has two degrees of freedom in two axes, a first axis (e.g., x) and a second axis (e.g., y), that allows the device to specify positions in a plane.

The invention is related to the use of data processing system 80, or similar systems, for providing control functions for network switches such as switch 12A and to provide database management and data distribution functions to facilitate the porting of numbers to different rate areas. According to one embodiment of the invention, these functions are provided by data processing system 80 in response to processor 84 executing one or more sequences of one or more instructions contained in main memory 86. Such instructions may be read into main memory 86 from another computer-readable medium, such as storage device 90. Execution of the sequences of instructions contained in main memory 86 causes processor 84 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 84 for execution. Such a medium may take many forms, including but not limited to, non-volatile media, volatile media, and transmission media. Non-volatile media include, for example, optical or magnetic disks, such as storage device 90. Volatile media include dynamic memory, such as main memory 106. Transmission media include coaxial cables, copper wire and fiber optics, including the wires that comprise bus 82. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 84 for execution. For example, the instructions may initially be borne on a magnetic disk of a remote computer. The remote computer can load the instructions into its dynamic memory and send the instructions over a telephone line using a modem. A modem local to data processing system 80 can receive the data on the telephone line and use an infrared transmitter to convert the data to an infrared signal. An infrared detector coupled to bus 82 can receive the data carried in the infrared signal and place the data on bus 82. Bus 82 carries the data to main memory 106, from which processor 84 retrieves and executes the instructions. The instructions received by main memory 86 may optionally be stored on storage device 90 either before or after execution by processor 84.

Data processing system 80 also includes a communication interface 98 coupled to bus 82. Communication interface 98 provides a two-way data communication coupling to a network link 100 that is connected to a local network 102. For example, communication interface 98 may be an integrated services digital network (ISDN) card or a modem to provide a data communication connection to a corresponding type of telephone line. As another example, communication interface 98 may be a local area network (LAN) card to provide a data communication connection to a compatible LAN. Wireless links may also be implemented. In any such implementation, communication interface 98 sends and receives electrical, electromagnetic or optical signals that carry digital data streams representing various types of information.

Network link 100 typically provides data communication through one or more networks to other data devices such as billing system 40 (where system 80 is programmed to provide control functions for a network switch), or network link 100 also may provide a connection through local network 102 to a NPAC computer 34 which provides information for updating network database 30 (where system 80 is programmed to function as database manager 32). In other embodiments of the present invention other means for provision of communication services, such as through the worldwide packet data communication network, now commonly referred to as the "Internet" can be used. Local network 102 and the Internet both use electrical, electromagnetic or optical signals that carry digital data streams. The signals through the various networks and the signals on network link 100 and through communication interface 98, which carry the digital data to and from data processing system 80, are exemplary forms of carrier waves transporting the information.

Data processing system 80 can send messages and receive data, including program code, through the network(s), network link 100, and communication interface 98. Data processing system 80 can send messages and receive data, including program code, from host 104 through local network 102, network link 100, and communication interface 98, or in any other convenient manner, such as over the Internet or wireless communication. The received code may be executed by processor 84 s it is received, and/or stored in storage device 90 or other non-volatile storage for later execution. In this manner, data processing system 80 may obtain application code in the form of a carrier wave.

In some embodiments of the present invention (where system 80 is programmed to function as database manager 34) routing database 36 is comprised in storage device 90. In other embodiments (where system 80 is programmed to provide control functions for network switches) local database 38 is comprised in storage device 90.

While in the embodiments shown the functions described above have all been carried out by processor 80 in other embodiments one or more functions can be carried out by separate systems communicating through local network 102 or in any other convenient, manner.

Programming of system 80, or of other systems within the contemplation of the present invention, is well within the ability of those skilled in the art, and need not be described further here for an understanding of the present invention.

Introduction of transparent numbers will require modifications to the existing switched network, including modification of: switch logic, common channel signaling protocol, carrier operation support systems such as are used for billing and telephone inventory, the existing routing database, and the NPAC and associated systems. Those skilled in the art will readily recognize and implement the necessary changes, and further discussion of such changes is not believed necessary for an understanding of the present invention.

A particular advantage of the present invention is that the use of transparent numbers allows porting of numbers from wireless (i.e. mobile) networks to landline networks. Because the wireless industry does not require NPA-NXX rate area associations based on their customers' locations, it is likely that a number that a wireless customer wishes to port to a landline network will not correspond to the rate area for the customer's landline service. With transparent numbers this is not an issue because the rate area is indicated independently of the NPA-NXX of the number. Thus the present invention provides reciprocity to porting between wireless and landline customers.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for improving the utilization of numbers in a switched network, each of said numbers nominally indicating a rate area, said method comprising the steps of:
   a) requesting that a number not assigned to a station in said nominally indicated rate area be ported to a switch serving a different rate area;
   b) storing information associating said number with said different rate area in a database, said associating information including a location routing number and a rate area indicator indicating said different rate area and additional to said location routing number; and
   c) thereafter, providing said associating information from said database in response to requests from switches which have received said number as a called number.

2. A method as described in claim 1 comprising the further steps of:
   a) defining a group of numbers as portable;
   b) providing data identifying said group of numbers to switches routing calls to said switch serving said different rate area;
   c) controlling said routing switches to determine locally if a received called number is portable; and
   d) controlling said routing switches to request associating information for said received called number from said database only if said received called number is portable.

3. A method as described in claim 1 wherein said number is initially associated with a wireless network.

4. A method as described in claim 1 wherein said routing switches are further programmed to determine said nominally indicated rate area from said number if accessing said database system does not determine a rate area associated with said number.

5. A method for improving the utilization of numbers in a switched network, each of said numbers having an associated rate area, said method comprising:
   a) a step for requesting that a number not assigned to a station in said associated rate area be ported to a switch serving a different rate area;
   b) a step for storing information associating said number with said different rate area in a database, said associating information including a location routing number and a rate area indicator indicating said associated rate area and additional to said location routing number; and
   c) a step for, thereafter, providing said associating information from said database in response to requests from switches which have received said number as a called number.

6. A computer-readable medium carrying one or more sequences of one or more instructions for controlling a network database manager to reduce the fraction of numbers stranded in a rate area, the one or more sequences of one or more instructions including instructions which, when executed by one or more processors, cause the one or more processors to control said system to perform the steps of:
   a) receiving information associating numbers that are not assigned to stations in rate areas nominally indicated by said numbers with different rate areas, said associating information including a location routing number and a rate area indicator indicating said different rate areas and additional to said location routing number;
   b) maintaining said associating information in a network database;
   c) thereafter, providing said associating information from said network database in response to requests from switches, which have received, said numbers as called numbers.

7. A computer-readable medium carrying one or more sequences of one or more instructions for controlling a Number Portability Administration Center system to reduce the fraction of numbers stranded in a rate area, the one or more sequences of one or more instructions including instructions which, when executed by one or more processors, cause the one or more processors to control said system to perform the steps of:
   a) communicating with database managers in a public switched network to receive information indicating when a number that is not assigned to a station is ported to a switch serving a rate area;
   b) providing information associating said number and said rate area to said network database managers, said associating information including a location routing number and a rate area indicator indicating said served rate area and additional to said location routing number.

8. A method according to claim 1, wherein the rate area indicator includes an area code and an office code of the different rate area.

9. A method according to claim 1, wherein said location routing number indicates a first area code and a first office code corresponding to said switch and said rate area indicator indicates a second area code and a second office code corresponding to said different rate area.

10. A method according to claim 1, further comprising:
    transmitting the rate area indicator to a billing system associated with the switched network.

* * * * *